United States Patent
Nomura et al.

[11] Patent Number: 5,156,498
[45] Date of Patent: Oct. 20, 1992

[54] METHOD FOR CONTROLLING MOISTURE CONTENT OF SILICA POWDER

[75] Inventors: Hiroshi Nomura; Kohichi Yoshihara; Yoshio Mitani, all of Tokuyama, Japan

[73] Assignee: Tokuyama Soda Kabushiki Kaisha, Yamaguchi, Japan

[21] Appl. No.: 678,156

[22] Filed: Apr. 2, 1991

[30] Foreign Application Priority Data

Apr. 5, 1990 [JP] Japan .................................. 2-89175

[51] Int. Cl.⁵ ............................................. B65G 53/04
[52] U.S. Cl. ........................................ 406/48; 406/197
[58] Field of Search ................... 406/48, 46, 136, 197

[56] References Cited

U.S. PATENT DOCUMENTS

| | | | |
|---|---|---|---|
| 3,512,845 | 5/1970 | Milewski et al. | 406/48 |
| 4,077,612 | 3/1978 | Ricciardi | 406/48 X |
| 4,773,960 | 9/1988 | Vincelli et al. | 406/48 X |
| 4,789,272 | 12/1988 | Matsubara et al. | 406/48 |

FOREIGN PATENT DOCUMENTS

3-36761 6/1991 Japan .

Primary Examiner—Margaret A. Focarino
Assistant Examiner—Gary C. Hoge
Attorney, Agent, or Firm—Wenderoth, Lind & Ponack

[57] ABSTRACT

A method for controlling a moisture content of a silica powder, which comprises contacting a fluid-flowing silica powder with a steam in a vessel, for example, a pipeline for transportation by air that connects a hopper for storing of a silica powder and a solid-gas separator, held at a temperature lower than a condensation temperature of the steam.

5 Claims, 1 Drawing Sheet

METHOD FOR CONTROLLING MOISTURE CONTENT OF SILICA POWDER

This invention relates to a method for controlling the moisture content of a silica powder. More specifically, this invention relates to a method for controlling a moisture content of a silica powder easily and simply by contacting a fluid-flowing silica powder with steam in a vessel held at a temperature lower than a condensation temperature of the steam.

BACKGROUND OF THE INVENTION

Silica powder has been widely used as an additive to rubbers, paints, etc. Moreover, the silica powder is usually obtained by a wet method in which an alkali silicate is neutralized with a mineral acid or a dry method in which a halogenated silane is decomposed in flame. The silica powder obtained by the former method is also called hydrated silicic acid and is a product usually having a moisture content of 2 to 6%. Since, however, the product is obtained in a wet state, it is ordinarily necessary to reduce the moisture content through the drying procedure as much as possible. While the silica powder obtained by the latter method is called fumed silica and is inherently unhydrated silica.

As the silica powder however has substantial water absorbability, it adsorbs a moisture in an ambient atmosphere and has been supplied as a product of a certain moisture level according to a storage environment and a storage state of the product. It has been so far estimated that the higher the moisture content, the less desirable the product in respect of properties; an attempt has been made to minimize the moisture content. Especially, the fumed silica is inherently unhydrated silica, and an attempt has been made to prevent it from being hydrated as much as possible because of preconception that the lower the moisture content the better or for the reason that when the fumed silica is used by being dispersed in a resin as a filler, wettability between a lipophilic group present in the resin and water present in the silica surface is poor. In fact, the fumed silica is, when contacted with a large amount of water or mist, agglomerated to form grits, degrading the properties. Accordingly, contacting the product with water has been avoided.

In the aforesaid technical background, an attempt to positively control the moisture content of the silica powder by contacting the silica powder with the moisture has not been made nor studied.

Meanwhile, the silica powder finds various uses. It has been found that when the silica powder is used as a filler of a resin, for example, by previously surface-treating it with a surface treating agent such as methyl silane or a silane coupling agent, a given moisture content improves reactivity with the surface treating agent and good results are provided. Development of a technique to control the moisture content of the silica powder which can prevent formation of grits has been therefore demanded.

The present inventors have made assiduous research to develop a technique to positively impart an optional moisture content to a silica powder without impairing the properties, and as a result, surprisingly discovered that an optional moisture content can be imparted to a silica powder without impairing the properties by using a steam and contacting the silica powder with the steam at a temperature lower than a condensation temperature of the steam. This has led to completion of this invention.

That is, it is an object of this invention to impart an optional moisture content to a silica powder without impairing the properties.

Another object of this invention is to provide a technique to control a moisture content of a silica powder by an industrially simple means.

Still another object of this invention is to impart an optional moisture content to a silica powder during transportation of said silica powder by air.

The other objects of this invention will be made clear by the following explanation.

SUMMARY OF THE INVENTION

The aforesaid various objects of this invention can be achieved by a method for controlling a moisture content of a silica powder by contacting the fluid-flowing silica powder with a steam in a vessel held at a temperature lower than a condensation temperature of the steam.

A material in this invention is a silica powder. A method for producing the silica powder is not particularly limited and it can be formed by either a wet method or a dry method. However, the silica powder with almost no moisture content obtained by the dry method, i.e. the fumed silica exhibits the effects of this invention most.

Figure 1:
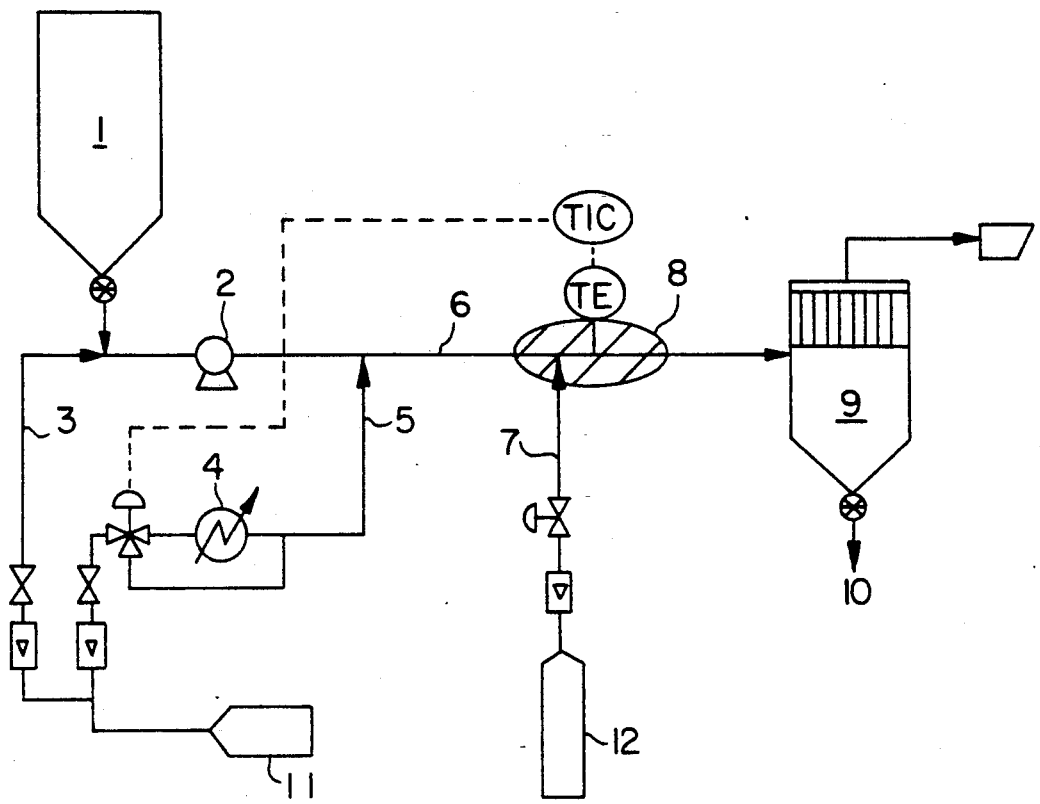
FIG. 1 is a flow sheet explaining a typical embodiment of this invention along with equipment for a plant process to prevent condensation.

The silica powder in this invention is rendered in a fluid-flowing state in order to uniformly impart the moisture content thereto when contacted with the steam. As the silica powder has itself low bulk density of e.g. 0.02 to 0.4 g/ml, it can easily be rendered in the fluid-flowing state by blowing air therein. The fluid-flowing state can also be provided with other gases, e.g. a nitrogen gas, a carbon dioxide gas and steam. Accordingly, a procedure is employable in which a steam is contacted with the silica powder maintained in the fluid-flowing state by these gases under the conditions which will be later described. Especially, an industrially recommendable procedure is that this invention is worked midway in the pipeline from the step of producing the silica powder to the delivary of the product. When there is a storage silo of the silica powder, it is advisable to work this invention midway in the pipeline of transporting the silica powder by air from the step of producing the silica powder to the storage silo or from the storage silo to the delivery of the product. The fluid-flowing state can be provided too by utilizing a fluidized bed.

In contacting the silica powder with the steam in this invention, the temperature inside the vessel in which to effect the contact has to be held at a temperature lower than the condensation temperature of the steam. The temperature inside the vessel varies with a partial pressure of the steam and conditions of the vessel. However, a temperature lower than a condensation temperature of the steam can properly be selected. It is advisable to select it from the range of 20° to 90° C. It is preferable to make said temperature as low as possible within the above range because a steam of a lower pressure can be used and the moisture content imparted to the silica powder relative to the amount of the steam fed in can effectively be utilized.

Said steam may be an easily available one in a factory. It is ordinarily advisable to select the steam from steams having a gauge pressure of 1 to 30 kg/cm$^2$.

If the conditions of contacting the silica powder with the steam are determined, the condensation amount of water can easily be calculated from data of a vapor pressure of steam and a given temperature, and the moisture content imparted to the silica powder in this invention can easily be calculated on the basis of the condensation amount of steam. Consequently, the moisture content imparted to the silica powder can optionally be controlled by adjusting the type of the steam, the amount thereof and the contact conditions, e.g. the contact temperature. Taking account of preventing degradation of properties of the silica powder, it is industrially preferable that the moisture content of 10% by weight or less is imparted to the silica powder. The moisture content of 0.5 to 2.0% by weight is more preferable in case of fumed silica. In case of wet silica, it is advisable that the moisture content is adjusted to 4 to 8% by weight.

In accordance with the method of this invention, the contact between the silica powder and the steam can uniformly achieve adsorption of water in a quite short time, e.g. less than several seconds, if required, less than 1 second. There is no need to make a special device for contacting the silica powder with the steam; it can advantageously be performed in part of a pipeline to transport the silica powder as stated above.

One of the most typical embodiments in applying this invention to an industrial equipment will be described referring to FIGS. 1 and 2 attached hereto.

A given amount of a silica powder is transported from a storage hopper 1 via a diaphragm pump 2 together with air 5 for transportation. Air from source 11 heated or cooled by a heat exchanger 4 is fed into an air conveyor line 6 to control the silica powder before controlling the moisture content to a given temperature during its transportation by air. Next, a given amount of a steam source 12 is introduced via line 7 so as to disperse it uniformly midway in an air transportation line 6, thereby providing a moisture content controlling zone 8 in said line. In this moisture content controlling zone 8, the temperature of the side downstream of the introduction line of the steam 7 is adjusted via temperature element 14 and temperature indicating controller 13 to a given temperature of condensing the introduced steam 7 to control the moisture content of the silica powder.

To explain in more detail, the moisture content of the silica powder is controlled to a desired value of 10% by weight or less by condensing a given amount of the steam through a method in which the silica powder being transported by air is contacted with the steam fed in and the amount of the steam fed in and/or the temperature in the moisture content controlling zone is controlled, and adsorbing the resulting condensed moisture to the silica powder. Especially, a method in which only the amount of the steam fed in is controlled by adjusting the moisture content controlling zone to a fixed temperature is industrially preferable. In this method, the moisture content controlling zone is adjusted to as low a temperature as possible whereby the amount of the steam fed in can be reduced, as well as the silica powder with the moisture content well controlled can be obtained without accompanying formation of grits by excess condensed moisture and impairing quality of the silica powder. Of course, the adsorbed moisture can also be controlled by a method in which the temperature of the moisture content controlling zone is controlled upon fixing the amount of the steam fed in.

In the method of this invention, the moisture content can be well controlled within a short time of 1 second or less by contacting the silica powder with the steam, so that a distance between the introduction line of the steam to the moisture content controlling zone held at a fixed temperature is short and a narrow space is therefore sufficient. Moreover, the silica powder with the moisture content controlled is passed through a line, separated from air of a high humidity in a solid-gas separator 9 such as a bag filter, collected 10, and moved to an airtight bag, a storage hopper or a tank lorry as required. As shown in FIG. 2, it is desirable that the silica particles 20 in downstream line 15 after passing through the moisture content controlling zone 16 into which the steam 17 has been introduced through steam feed line 18 is warmed or heated by heater 19 to a higher temperature than that of the moisture content controlling zone, as required to prevent condensation.

In this invention, the moisture content can be controlled not by usual equilibrium adsorption but by adsorption under conditions of condensing a water vapor into water, so to speak, condensation adsorption. Silica obtained by said condensation adsorption is surprisingly almost free from grits and exhibits high dispersibility even when mixing a resin, etc. as will be later described.

The method for controlling the moisture content of the silica powder in this invention can provide the following effects.

(1) Compared to conventional methods, an optional moisture content can easily be imparted to the silica powder in the range of 10% by weight or less.

(2) Because the condensed moisture is adsorbed to the silica powder upon utilizing the condensation action of the steam, the moisture content can be controlled in a short time of 1 second or less.

(3) Since the steam is introduced midway in the line to transport the silica powder by air, the moisture content controlling zone is short and the moisture content can be controlled in a narrow space. Accordingly, the space of the moisture content controlling equipment can be minimized.

(4) Since the moisture content is controlled in a continuous line of transporting the silica powder by air in a short time, a large amount of treatment can be provided.

EXAMPLE 1

Figure 2:
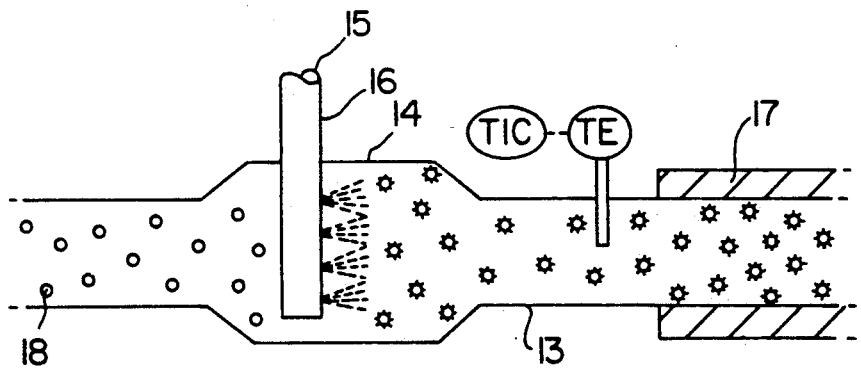

Using a moisture content controlling equipment of a process shown in FIG. 1, the moisture content was controlled with respect to REOLOSIL (a tradename for fumed silica made by Tokuyama Soda Co., Ltd.) having a particle diameter of 5 to 50 millimicrons.

Fumed silica (280 kg/hr) was transported by a storage hopper along with 80 Nm$^3$/hr of air for transportation. Into a transportation pipeline of the fumed silica a heating air was fed before controlling the moisture content and 13.8 kg/hr of a steam was then introduced. Subsequently, while maintaining the temperature of the moisture content controlling zone at 53° C., the moisture content was controlled. Then, the fumed silica passing through the moisture content controlling zone is separated from the gas by a bag filter and collected.

The transportation line after the moisture content controlling zone and the bag filter were warmed by the steam and the heating air.

As a result, a found value of the moisture content of the collected fumed silica was 0.90% by weight. The condensed moisture content was calculated from the vapor pressure of the steam relative to the amount of the steam fed in. A ratio of the found value and the calculated value of the moisture content was 95% meaning that they substantially agreed with each other. The moisture content of the fumed silica before controlling the moisture content was about 0.01 or less.

COMPARATIVE EXAMPLE 1

A mist-like water was sprayed onto the same fumed silica as used in Example 1 by a commercial spray to obtain fumed silica having the moisture content of 0.88%.

Evaluation Test 1

Regarding the fumed silica with the moisture content controlled in Example 1 and the fumed silica with the moisture content controlled in Comparative Example 1, the amounts of the formed grits were measured by the following method. The results are shown in Table 1. Samples used to measure the amounts of the grits are the products obtained in Examples 1 and Comparative Example 1 which were stored in aluminum packs for 30 days. Method for measuring grits:

Twenty grams of fumed silica was added to 200 ml of water, and they were vigorously mixed by a homomixer (made by Tokushukika Co., Ltd.) for 3 minutes. The resulting silica suspension was passed through a sieve 75 mm in diameter and 45 micrometers in sieve opening size. Subsequently, the sieve was washed by causing water to flow through the sieve openings at a rate of 2.5 to 3.0 liters/min for 3 minutes. Said sieve was then dried in an oven at 120° C., the weight of the grits remaining on the sieve was measured and the weight ratio was calculated.

TABLE 1

|  | Moisture content (%) | Amount of grits (ppm) |
| --- | --- | --- |
| Fumed silica in Example 1 | 0.90 | less than 10 |
| Fumed silica in Comparative Example 1 | 0.88 | 270 |

Evaluation Test 2

A polyester resin (155 g) was dissolved in 25 g of a styrene monomer, and the solution was adjusted to a viscosity of 70 cps. To the solution was added 1.0 phr of a silica powder. They were mixed at 10,000 rpm for 2 minutes by a homomixer. The mixture was then left to stand in a constant temperature bath at 25° C. for 2 hours. Subsequently, the viscosity of the styrene solution of the polyester resin containing the silica powder was measured at 60 rpm using a B-type rotation viscometer. The results are shown in Table 2.

TABLE 2

|  | Moisture content (%) | Viscosity of the resin (cp) |
| --- | --- | --- |
| using fumed silica in Example 1 | 0.90 | 540 |
| using fumed silica in Comparative Example 1 | 0.88 | 430 |

EXAMPLES 2-5

Example 1 was repeated except that the amount of silica transported, the amount of air for transportation, the temperature of the moisture content controlling zone and the amount of the steam fed in were changed as shown in Table 3. In regard to the adsorbed moisture of the fumed silica, the ratio of the found value and the calculated value is shown in Table 3.

TABLE 3

|  | Amount of silica powder transported (kg/Hr) | Amount of air for transportation (Nm³/Hr) | Amount of steam for controlling moisture content (kg/Hr) | Temperature of a moisture content controlling zone (°C.) | Found value of a moisture content of a silica powder (wt %) | Found value of a moisture content/ calculated value of a moisture content (%) |
| --- | --- | --- | --- | --- | --- | --- |
| Example 2 | 310 | 80 | 12.2 | 53 | 0.50 | 99 |
| Example 3 | 340 | 80 | 22.0 | 62 | 0.99 | 96 |
| Example 4 | 250 | 100 | 34.8 | 65 | 2.95 | 97 |
| Example 5 | 100 | 200 | 71.0 | 68 | 5.84 | 97 |

What we claim is:

1. A method for controlling a moisture content of a silica powder, which comprises contacting a fluid-flowing silica powder with a steam in a vessel held at a temperature lower than a condensation temperature of the steam.

2. The method of claim 1 wherein the vessel is a pipeline for transporting the silica powder by air.

3. The method of claim 1 wherein the temperature inside the vessel is 20° to 90° C.

4. The method of claim 1 wherein the silica is fumed silica.

5. The method of claim 2 wherein the pipeline for transportation of the silica powder by air conducts the silica powder from a hopper for storing of the silica powder to a means for the contacting of said silica powder with steam and then to a solid-gas separator.

* * * * *